US009907138B2

(12) United States Patent
Wang et al.

(10) Patent No.: US 9,907,138 B2
(45) Date of Patent: Feb. 27, 2018

(54) OCCUPANCY SENSING SMART LIGHTING SYSTEM (71) Applicant: Rensselaer Polytechnic Institute, Troy, NY (US)

(72) Inventors: Quan Wang, Yichang (CN); Xinchi Zhang, Shangahi (CN); Kim L. Boyer, Averill Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 15/318,732

(22) PCT Filed: Jun. 16, 2015

(86) PCT No.: PCT/US2015/036002
§ 371 (c)(1),
(2) Date: Dec. 14, 2016

(87) PCT Pub. No.: WO2015/195645
PCT Pub. Date: Dec. 23, 2015

(65) Prior Publication Data
US 2017/0135177 A1 May 11, 2017

Related U.S. Application Data (60) Provisional application No. 62/014,745, filed on Jun. 20, 2014.

(51) Int. Cl.
H05B 37/02 (2006.01)
H05B 33/08 (2006.01)
(52) U.S. Cl.
CPC ......... *H05B 33/0872* (2013.01); *H05B 33/08* (2013.01); *H05B 33/0815* (2013.01);
(Continued)

(58) Field of Classification Search
CPC .............. F21Y 2115/10; F21Y 2113/00; F21Y 2113/10; F21Y 2115/15; H05B 33/0872;
(Continued)

(56) References Cited

U.S. PATENT DOCUMENTS 3,069,654 A 12/1962 Hough
6,340,868 B1 1/2002 Lys et al.
(Continued)

FOREIGN PATENT DOCUMENTS

WO 2012137125 A2 10/2012
WO 2015195645 A1 12/2015

OTHER PUBLICATIONS

International Search Report and Written Opinion for PCT/US2015/036002 dated Sep. 17, 2015; 10 Pages.
(Continued)

*Primary Examiner* — Vibol Tan
(74) *Attorney, Agent, or Firm* — Hoffman Warnick LLC (57) ABSTRACT A smart lighting system and method that estimates occupancy using perturbation-modulated light and distributed non-imaging color sensors. A system is disclosed that includes a plurality of non-imaging color sensors; a plurality of color controllable lights; a system that perturbs the color controllable lights within a space; a system that collects resulting color information from the non-imaging color sensors, and builds a light transport model based on collected color information; a system that estimates an occupancy pattern or distribution within a space; and an adjustment module that adjusts the color controllable lights based on the light transport model and a predefined control strategy.

20 Claims, 6 Drawing Sheets (52) U.S. Cl.
CPC ..... *H05B 33/0845* (2013.01); *H05B 33/0854* (2013.01); *H05B 37/0227* (2013.01); *Y02B 20/48* (2013.01)

(58) Field of Classification Search
CPC ............ H05B 33/0842; H05B 33/0863; H05B 33/0869; H05B 33/0812; H05B 35/00; H05B 37/0272; H05B 33/0815; H05B 33/08845; H05B 33/0854; H05B 33/0866; H05B 37/0218; H05B 37/0227; F21V 23/0442; F21V 23/0457; F21V 14/06; F21V 19/001; F21V 23/003; F21S 10/02; F21S 2/00; G01J 3/0286; G01J 3/10; G01J 3/50; G01J 3/501; G08B 25/08; G08B 29/04
See application file for complete search history.

(56) References Cited

U.S. PATENT DOCUMENTS

| | | | |
|---|---|---|---|
| 6,759,954 B1 | 7/2004 | Myron et al. | |
| 8,033,686 B2* | 10/2011 | Recker | H05B 33/0803 362/249.02 |
| 8,138,690 B2* | 3/2012 | Chemel | F21V 17/02 315/294 |
| 8,222,584 B2* | 7/2012 | Rains, Jr. | F21S 2/00 250/205 |
| 8,305,014 B1 | 11/2012 | Li et al. | |
| 8,651,705 B2 | 2/2014 | Wilcox et al. | |
| 8,854,208 B2* | 10/2014 | Huizenga | G05B 15/02 340/3.1 |
| 8,909,380 B2* | 12/2014 | Golding | H05B 37/00 315/149 |
| 8,912,735 B2* | 12/2014 | Chobot | H05B 37/029 315/158 |
| 9,014,829 B2* | 4/2015 | Chemel | F21V 23/0471 700/19 |
| 9,049,756 B2* | 6/2015 | Klusmann | H05B 37/0218 |
| 9,148,935 B2* | 9/2015 | Mohan | G08B 17/12 |
| 9,155,165 B2* | 10/2015 | Chobot | H05B 37/029 |
| 9,236,767 B2* | 1/2016 | Recker | H02J 9/065 |
| 9,295,112 B2* | 3/2016 | Knapp | G09G 3/2003 |
| 9,510,426 B2* | 11/2016 | Chemel | H05B 33/0854 |
| 9,615,434 B2* | 4/2017 | Vangeel | F24F 11/006 |
| 9,644,828 B1* | 5/2017 | May | F21V 23/06 |
| 9,655,217 B2* | 5/2017 | Recker | H05B 37/0272 |
| 9,671,072 B1* | 6/2017 | May | F21K 9/278 |
| 2004/0105264 A1 | 6/2004 | Spero | |
| 2010/0171442 A1 | 7/2010 | Draper et al. | |
| 2011/0206254 A1 | 8/2011 | Patwardhan | |
| 2013/0297555 A1 | 11/2013 | Fadell et al. | |

OTHER PUBLICATIONS

Afshari, Sina et al.; "Modeling and control of color tunable lighting systems"; Energy and Buildings 68; 2014; pp. 242-253; Copyright 2013 Elsevier B.V.

Jia, Li et al.; "Simulation for pre-visualizing and tuning lighting controller behavior"; Energy and Buildings 70; 2014; pp. 287-302; Copyright 2013 Elsevier B.V.

Sen, Pradeep et al.; "Dual Photography"; ACM SIGGRAPH 2005 conference proceedings; pp. 11.

European Search Report for EP 15808886.4 dated Nov. 23, 2017; pp. 8.

\* cited by examiner

OCCUPANCY SENSING SMART LIGHTING SYSTEM

STATEMENT REGARDING FEDERALLY SPONSORED RESEARCH OR DEVELOPMENT

This invention was made with government support under EEC0812056 awarded by the NSF. The government has certain rights in the invention.

TECHNICAL FIELD

The subject matter of this invention relates to intelligent control of lighting in a space, and more particularly to a smart lighting system that provides occupancy sensing using perturbation-modulated light and distributed non-imaging color sensors.

BACKGROUND

The intelligent control of lighting, and particularly synthetic lighting, in a space over time in response to variables such as external (i.e., natural) lighting variations and room occupancy patterns has the potential to bring benefits in energy consumption, human comfort and well-being, and worker productivity.

Existing systems have various drawbacks including: (1) They often only detect the presence of people, and not their number and spatial distribution in the room; and (2) They typically use cameras or other high resolution sensors, which create high computational loads for real time operation and may present significant privacy or security concerns. Recognizing and responding to the spatial distribution of a room's occupants (e.g., a working group in a cluster versus several persons sitting around a conference table) in a cost effective manner is required to achieve the optimal spatial and spectral distribution of the synthetic light. Unfortunately, current systems cannot provide such a result.

SUMMARY

The present disclosure utilizes color controllable lighting and non-imaging color sensors distributed throughout a space to estimate the spatial distribution of people in the space in order to make real time lighting adjustments. A solution is provided in which small perturbations onto the color-controllable light are introduced. These perturbations are designed and sequenced to be imperceptible to humans, but are accurately measurable by the color sensors. A rapid series of measurements is made with the sensors under different perturbations in the lighting, and these measurements are used to estimate a light transport model. The light transport model contains a measure of the light flux between each fixture-sensor pair, as a function of color, e.g., red, green, blue (RGB). This is done in such a way that the ambient lighting (from a window, for example) is subtracted from the model, leaving only the linear (controllable) part of the relationship. With the light transport model determined, various options are provided for estimating the occupancy pattern in the room.

In a first aspect, the invention provides a smart lighting system comprising: a plurality of non-imaging color sensors; a plurality of color controllable lights; a system that perturbs the color controllable lights within a space; a system that collects resulting color information from the non-imaging color sensors, and builds a light transport model based on collected color information; a system that estimates an occupancy within a space; and an adjustment module that adjusts the color controllable lights based on the light transport model and a predefined control strategy.

In a second aspect, the invention provides method for controlling lighting in a space having a plurality of color sensors and a plurality of color controllable lights, the method comprising: outputting control values to the color controllable lights to cause a base light to be generated within a space; periodically outputting further control values to perturb the color controllable lights within the space; collecting resulting color information from the color sensors; building a light transport model based on the color information; utilizing the light transport model (either directly or as changed with respect to a starting model) to calculate an estimated occupancy of the space; and adjusting the base light in response to the estimated occupancy and a predefined control strategy.

In a third aspect, the invention provides a lighting control system that adjusts a set of color controllable LED lights based on an estimated occupancy, the system comprising: a lighting controller that outputs values to the set of color controllable LED lights to generate a base light within the space and to cause perturbations to be added to the base light; a sensor data manager that receives sensed color information from a plurality of non-imaging color sensors located within the space; a light transport modeler that stores the sensed color information and associated perturbation information in a light transport model; and an occupancy estimation system that calculates an estimated occupancy of the space based on the light transport model (either directly or as changed from a base model), wherein the estimated occupancy is provided to the lighting controller to adjust the base light.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As detailed herein, an occupancy sensitive smart lighting system is provided such that, when the occupancy of the room changes, the system produces lighting conditions that best suit the current occupancy scenario to maximize comfort and minimize energy consumption. "Occupancy" generally refers to the number and/or spatial distribution of people in a space, such as a room, hallway, stairway, enclosed space, etc.; however, it could also refer to the number and spatial distribution other types of objects that may move in and out or about a space and impact lighting, e.g., animals, robots, etc. To implement occupancy sensitive smart lighting, a control strategy module and an occupancy sensing module are implemented, and they work in two stages: a sensing stage and an adjustment stage. In the sensing stage, the occupancy sensing module collects sensor readings to estimate the occupancy; in the adjustment stage, the control strategy module decides what lighting condition should be produced based on the estimated occupancy.

Figure 1:
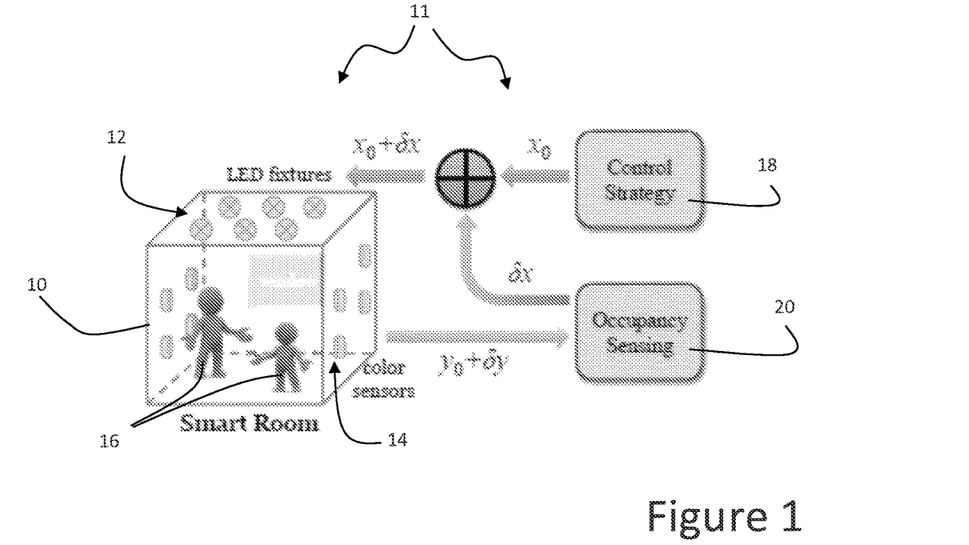
FIG. 1 depicts a smart lighting room with systems for implementing the sensing stage according to embodiments.
Figure 2:
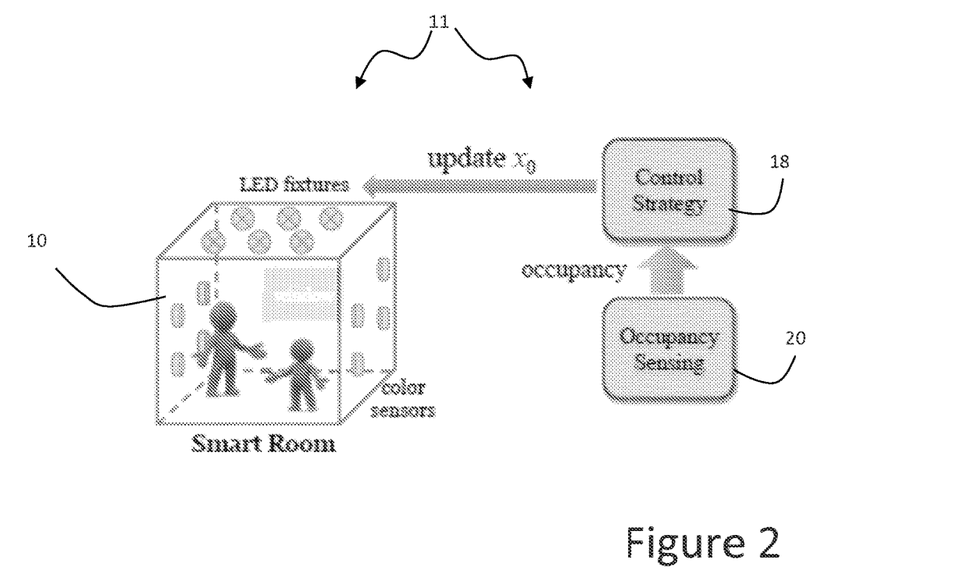
FIG. 2 depicts the smart lighting room of FIG. 1 with systems for implementing the adjustments stage according to embodiments.

FIGS. 1 and 2 depict a smart lighting system 11 for controlling lighting in a smart room 10 in which the occupancy 16 of the room 10 is estimated and the lighting is adjusted accordingly. Smart lighting room 10 includes a set of color controllable LED (light emitting diode) fixtures 12 and a set of non-imaging color sensors 14. Non-imaging color sensors 14 generally comprise low cost sensors that do not collect image data, but instead only sense and collect color information. In the sensing stage shown in FIG. 1, a control strategy module 18 is provided to generate a base light $x_0$ into the room 10 and an occupancy sensing module 20 is provided to estimate the occupancy of the room 10. In the adjusting stage shown in FIG. 2, the sensing module 20 causes the control strategy module 18 to update the base light $x_0$ into the room 10 in accordance with the estimated occupancy.

In the sensing stage (FIG. 1), occupancy sensing module 20 causes a series of subtle perturbations to be added to (i.e., "perturb") the base light in the color LED lighting fixtures 12. Color sensors 14 sense color information for each perturbation which is stored and processed by the occupancy sensing module 20 to estimate occupancy of the room. More particularly, the control strategy module 18 perturbs the base light $x_0$ of the color controllable LED fixtures 12 to predetermined values. Current LED techniques allow for LED fixtures 12 to deliver rapidly changing lighting conditions, which can be sensed by color sensors 14. In the illustrative embodiments described herein, color controllable LED fixtures 12 may be implemented with control over three color channels: red, green and blue (RGB). However, it is understood that LED fixtures with additional or different color channels could likewise be utilized. Control value inputs for each channel may be a scalar value between 0 and 1. Accordingly, each LED fixture may be controlled with a set of control values to set each color component, e.g., an RGB LED fixture may receive sets of control values such as C=[0.65, 0.88, 0.34].

Figure 9:
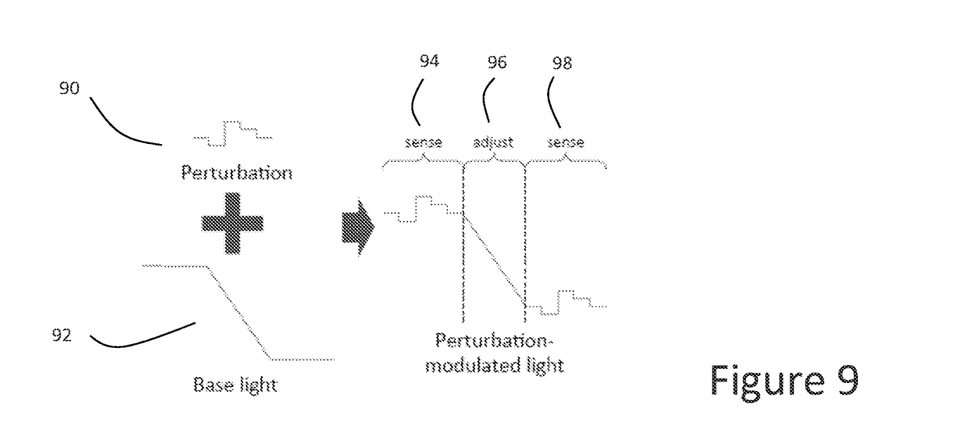
FIG. 9 depicts a diagram of perturbation being added to a base light according to embodiments.

After the initial base light $x_0$ is set, occupancy sensing module 20 adds a series of perturbations $\delta_x$ to the base light $x_0$, and a sensed output $y_0+\delta_y$ is measured for each perturbation by the color sensors 14. The collection of sensed outputs are stored, analyzed and then used to update the base light in the adjusting stage. In a typical embodiment, the base light will be controlled to change slowly within a large color range, while the perturbations will be controlled to change quickly and ideally imperceptibly, within a small color range. This is analogous to amplitude modulation (AM) in electronic communications, where low-frequency information rides on a high-frequency carrier. The difference is that, in the present system the intensity of the carrier, or the base light, is analogous to the low-frequency component and the perturbations are analogous to the high-frequency components. An example of this is shown in FIG. 9, in which a sequence of perturbations 90 are added to a base light 92 such that a perturbation modulated light is provided having a sensing stage 94, and adjustment stage 96, a next sensing stage 98, etc. 4. The time between the periodic sensing stages may be implemented in any manner, at regular or irregular frequencies (e.g., every two minutes, more often during work hours, less often at nighttime), based on triggering events (e.g., a door opening), etc.

It is understood that although various illustrative embodiments are described, the invention is not intended to be limited to particular equipment or design specifications. For example, variations in the sensor response functions (e.g., with respect to angle or wavelength), the number of primary colors used, luminosity functions for the fixtures, etc., are intended to covered herein.

Figure 3:
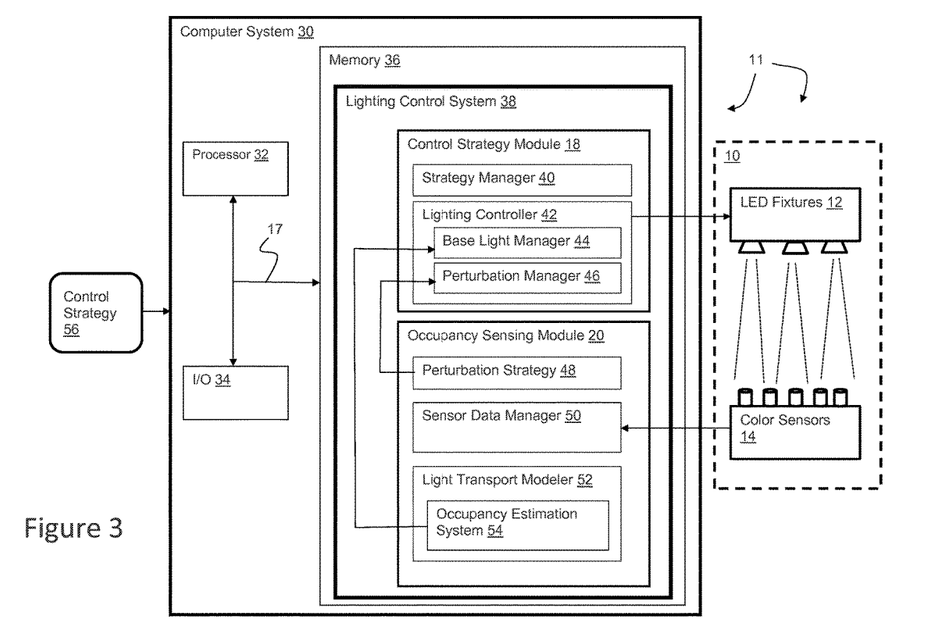
FIG. 3 depicts a computer system having a lighting system according to embodiments.

FIG. 3 depicts an illustrative computer system 30 for implementing a lighting control system 38 for a smart lighting system 11 that includes a control strategy module 18 and an occupancy sensing module 20. As shown, control strategy module 18 includes a strategy manager 40 and a lighting controller 42. Strategy manager 40 defines a desired lighting strategy for the room 10, e.g., based on a user inputted control strategy 56 and/or other predefined settings. For example, the lighting strategy may provide for a certain amount, distribution, or concentration of lighting to achieve some desired result within a space, e.g., maximum energy savings, efficient task based lighting, TV watching mode, daytime mode, nighttime mode, reading mode, presentation mode, museum mode, dining mode, cleaning mode, etc. The particulars of specifying and implementing control strategies are generally outside the purview of this disclosure. Lighting controller 42 is responsible for manipulating the control values of the LED lighting fixtures 12, and may include a base light manager 44 for setting and adjusting the base light $x_0$ within the room. Base light manager 44 provides an initial setting for lighting in the room 10, and then provides periodic adjusted settings based on the desired strategy and estimated occupancy changes in the room 10. Perturbation manager 46 determines and implements further or adjusted control values to cause perturbations 46 to the LED lighting fixtures 12 that are then evaluated by the occupancy sensing module 20 to estimate occupancy.

Occupancy sensing module 20 generally includes a perturbation strategy 48, a sensor data manager 50 and a light transport modeler 52. Perturbation strategy 48 is responsible for determining the amount and types of perturbations that are to be periodically outputted by the lighting controller 42. Sensor data manager 50 is responsible for periodically collecting sensor data from the color sensors 14 and aligning the collected data with associated perturbations generated by the LED fixtures 12. This may for example be done using standard input/output techniques, e.g., with a cache, file system, etc. Light transport modeler 52 is responsible for then storing the sensor information and associated perturbation data within the light transport model. In the illustrative embodiments described herein, the light transport model comprises a light transport matrix; however, other modeling constructs could likewise be utilized, e.g., a graph, a neural network, etc. Occupancy estimation system 54 processes the light transport model (either directly or via changes to the model) to provide or calculate an estimated occupancy, which is fed back to lighting controller 42 to periodically adjust the base light $x_0$. Estimated occupancy may be presented in any manner, e.g., as binary data, as a data structure, a visual model, a data vector, a table, XML data, etc.

The light transport model or matrix thus provides the basis for estimating occupancy and adjusting the base light $x_0$. As shown in FIGS. 1 and 2, sensed outputs $y_0+\delta_y$, measured by the color sensors 14 are collected and inputted into the light transport model or matrix A. For example, assume 12 different LED lights in room 10, each having three channels, red, green and blue, then the input into the system is a 36 dimensional control signal x. Further, assume 12 color sensors, each with four channels, red, green, blue and white, then the measured output is a 48 dimensional signal y. The relationship between x and y is given as:

$$y=Ax+b$$

where A is the light transport matrix and the vector b is the sensor response to the ambient light. The light transport matrix A is only dependent on the occupancy scenario, and is not affected by the input light or any ambient light. The light transport matrix A thus provides a signature of the occupancy. Vector b is canceled out as follows. When the input is set to a given level $x_0$, the output of the sensors is $y_0 = A x_0+b$. If a small perturbation $\delta x$ is added to the input, the new output becomes $y_0+\delta y=A(x_0+\delta x)+b$. By simple subtraction, b is eliminated, and $\delta y=A\delta x$. Here $x_0$ is referred to as the base light, which is determined by the control strategy module 18. If $y_0$ is measured once, and $y_0+\delta y$ is measured many times with different $\delta x$, then a linear system to solve for A is provided. In other words, the inputs to the LED fixtures $x_0$ are perturbed with randomly generated m1 dimensional signals $\delta x1, \delta x2, \ldots, \delta xn$, and the system measures the m2 dimensional changes of the sensor readings $\delta y1, \delta y2, \ldots, \delta yn$. Let $X=[\delta x1, \delta x2, \ldots, \delta xn]$ and $Y=[\delta y1, \delta y2, \ldots, \delta yn]$, where X is an m1×n array and Y is an m2×n array. The result is a linear system $Y=AX$.

Two different cases may be considered when determining A: an overdetermined system and an underdetermined system. The particular implementation will generally depend on how many measurements can be made within a required time interval, which in turn depends the number of sensors and lights, their response times, and the speed of the computer. If enough measurements can be made to ensure n>m1, then this overdetermined linear system can be simply solved by the pseudo-inverse: $A=Y X^T(XX^T)^{-1}$, which corresponds to the minimization of the Frobenius norm of the error: $\min_A \|Y-AX\|_F$.

If there are not enough measurements, the linear system is underdetermined, and does not have a unique solution. Then extra constraints need to be added to find a particular unique solution. If the fixtures can change the light extremely fast, and the sensors can make measurements very fast, then n different measurements can be made in a very short period, during which both A and b are constant. However, in the real world, the fixtures have delays after the input control signals are specified and before the corresponding light is delivered. Also, the sensors have two kinds of delays: the integration time and the communication time (handshaking time). The integration time is the time interval during which the photodiodes measure the luminous flux; the communication time is the time interval during which the sensors send the measurements to the system. With these delays, if n is too large, then one can no longer assume that A and b are constant during the n measurements. This is the motivation to solve underdetermined systems. Though there cannot be very large n in the system run time, many measurements can be made for the empty room as an offline calibration step before running the system.

Suppose the light transport matrix $A_0$ for an empty room has been determined using $A=Y X^T(XX^T)^{-1}$. Now, if the room occupancy changes, the light transport matrix A will also change. To recover the new A, the system again randomly perturbs the LED input with $X=[\delta x1, \delta x2, \ldots, \delta xn]$, and measures the changes of color sensor outputs $Y=[\delta y1, \delta y2, \ldots, \delta yn]$ to determine constraints $Y=AX$. To ensure real time performance, the system can only take a limited number of measurements within a short time interval, during which it can assume the occupancy, the base light $x_0$, and the sensor response b to the ambient light are all constant. Thus n<m1 resulting in an underdetermined system. To solve for A, extra constraints are added. One assumption is that the changes in the light transport model are sparse—when the occupancy changes, most light paths are not affected.

Figure 4:
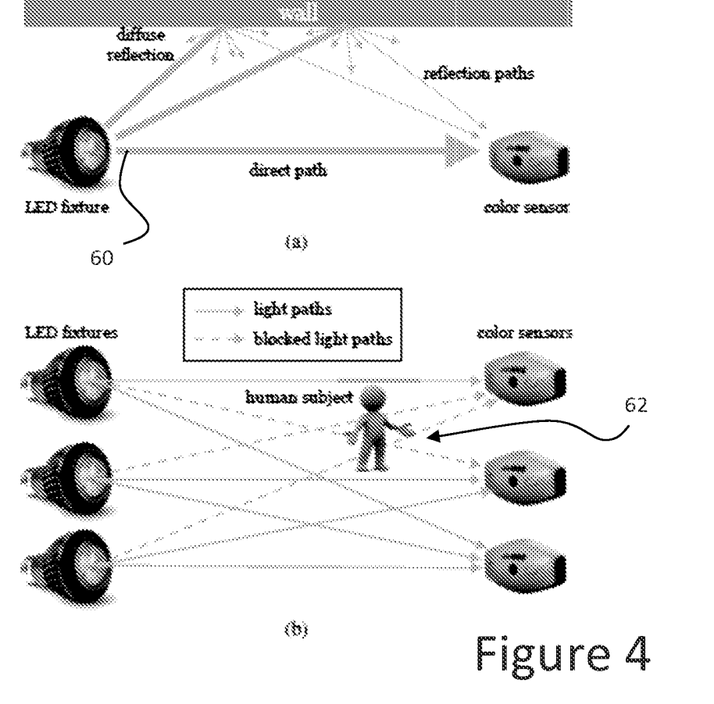
FIG. 4 depicts a set of light paths within a space according to embodiments.

Each entry of A can be thought of as a summation of responses from one sensor channel to one LED channel on all the light paths from this LED to this sensor. These light paths include the line segment connecting the LED fixture and the sensor (direct path), and numerous reflection paths (mostly diffuse reflection). Apparently, the direct path is the dominating component. When a human subject enters the room, he or she only blocks a limited number of these direct paths, as illustrated in FIG. 4. The sparsity assumption can be understood in this way: because the room is sparsely occupied, only a few direct paths will change when the room occupancy changes.

The goal is to minimize the difference between A and $A_0$. Since $Y=AX$, we have $A_0X-Y=(A_0-A)X$. Let $Z=A_0X-Y$ and $E=A_0-A$. Z can be interpreted as the change in sensor responses due to the change in room occupancy; E can be interpreted as the change in the light transport model due to the change in room occupancy. The matrix E is referred to as the light transport changes or the difference matrix. Then the problem becomes $Z=EX$, where E approximates the zero matrix, which can be formulated as:

$$\min_E \quad f(E)$$
$$\text{s.t.} \quad Z = EX,$$

where f(•) is a target function describing how deficient or sparse the matrix E is. Here it is understood that E is not really almost zero, because it is the change in the model which should be noticeable when the occupancy changes. The system is just looking for the E that is closest to zero matrix under the constraint $Z=EX$. There are different options for the function f(•):

$$f_1(E)=\text{rank}(E),$$

$$f_2(E)=\|E\|_F=\|\text{vec}(E)\|_2,$$

$$f_3(E)=\|\text{vec}(E)\|_0,$$

$$f_4(E)=\|\text{vec}(E)\|_1.$$

Here vec(•) denotes the vectorization of a matrix (stacking the columns into a single column vector). Different choices of the target function f(•) have different practical meanings, and correspond to different assumptions. If the rank of E is minimized, many rows of E are assumed linearly dependent. In another word, the change in the occupancy affects the light paths from the sources to different sensors in a similar way. Minimizing the Frobenius norm of E is not straightforward, but its solution is also the solution to rank minimization. Minimizing target function $f_3(E)$ or $f_4(E)$ will result in a sparse matrix E, where many entries of E are zeros. A sparse E means that only a limited number of direct light paths have changed as a result of the change in the room occupancy.

Rank Minimization

The rank minimization problem proposed here is different from the matrix completion problem above, where the goal is to recover a low-rank matrix from a small subset of its entries. The constraint is a linear system, not a known subset of entries. To solve the problem above with the target function, let the singular value decomposition (SVD) of X be $X=USV^T$, where U is an m1×m1 matrix, S is an m1×n matrix, and V is an n×n matrix. Then the constraint becomes ZV=EUS. Since n<m1, we can write S as a vector with $S_1$ and 0 as its entries, where S1 is the n×n diagonal matrix of the singular values of X. Let $EU=F=[F_1\ F_2]$, where $F_1$ is m1×n and $F_2$ is m1×(m1−n). Now the constraint is simply $F_1 S_1 = ZV$, or $F_1 = ZV\ S_1^{-1}$, and $F_2$ can be an arbitrary submatrix. Since the rank is invariant under unitary transforms, it is known that rank(E)=rank(EU)=rank(F) which is greater than or equal to rank($F_1$). Apparently, when $F_2$=0, rank(E)= rank($F_1$), thus the solution is $E=[ZV\ S_1^{-1}\ 0]U^T$.

An interesting observation here is that the solution to the rank minimization problem is also a solution to the Frobenius norm minimization problem. This is because the Frobenius norm is also invariant under unitary transforms:

$$\|E\|_F^2 = \|EU\|_F^2 = \|F\|_F^2 = \|F_1\|_F^2 + \|F_2\|_F^2,$$

and it takes its minimum also when $F_2$=0.

The rank minimization problem can also be viewed as a sparse recovery problem, because the rank of a matrix is simply the number of non-zero singular values of this matrix. Thus, minimizing the rank of a matrix is equivalent to minimizing the l0 norm of its vector of singular values.

Sparse Recovery

To solve the problem in above with a target function, Z=EX can be rewritten to its Kronecker product form:

$$\text{vec}(Z) = (X^T \otimes I_{m_2 \times m_2}) \text{vec}(E).$$

This is a standard compressed sensing problem, where vec(E) is the unknown sparse signal of interest, vec(Z) is the vector of measurements, and the Kronecker product $$\Phi = X^T \otimes I_{m_2 \times m_2}$$

is the sensing matrix.

Minimizing $f_3(E)$ is an l0 optimization problem, which is NP-hard. However, greedy algorithms such as orthogonal matching pursuit (OMP) can be used to find the approximate solution efficiently. Minimizing $f_4(E)$ is an l1 optimization problem, which can be recast as a linear programming problem.

Perturbation-Modulated Lighting

Various strategies exist for perturbing the base light $x_0$ during the sensing stage. For accurate recovery of the light transport matrix and the comfort of human subjects, the following may be considered:

1. The perturbation patterns should be rich in variation to capture sufficient information from the scene.
2. The magnitude of the perturbation should be small enough not to bother humans or animals (such as service dogs, for example) in the room.
3. The magnitude of the perturbation should be large enough to be accurately measured by the color sensors.

To meet the first requirement, randomly generated patterns usually suffice. If the magnitude of the perturbations is defined as $\rho = \max_i \|\delta x_i\|_\infty$, then the choice of ρ is a trade-off. When ρ is as small as 0.005, the sensor response is noticeably lost in noise or distorted; and as ρ gets larger, the sensor response becomes well-behaved. In an illustrative embodiment, ρ=0.025 such that perturbations are not easily noticed, but can be accurately sensed by the color sensors.

It is noted that quantitative analysis of the sensor sensitivity and signal distortion of an implemented sensor can be taken into account when designing sensors.

Assume n randomly generated perturbation patterns δx1, δx2, . . . , δxn with magnitude ρ. In the sensing stage, these patterns are applied to measure the changes in sensor outputs, and recover the light transport matrix A. Here a question arises: in what order should these perturbation patterns be arranged to maximize the comfort of human subjects? Intuitively, the light should change gradually. For example, if there is only one fixture channel, and there are four perturbations with intensities: 1, 1, 2, and 2. The arrangement 0"1"2"2"1"0 is obviously better than 0"1"2"1"2"0, since the light changes in the former arrangement are more gradual, and thus less noticeable. Here the perturbation sequence starts and ends with 0 because perturbations are based on the base light. For gradual change, the neighboring perturbation patterns should be as similar as possible. Let (i1, i2, . . . , in) be a permutation of (1, 2, . . . , n). Then (δxi1, δxi2, . . . , δxin) is a re-ordering of the patterns (δx1, δx2, . . . , δxn). The optimization problem may be formalized as:

$$\min_{(i_1, i_2, \ldots, i_n)} \left( \|\delta x_{i_1}\| + \sum_{k=1}^{N-1} \|\delta x_{i_{k+1}} - \delta x_{i_k}\| + \|\delta x_{i_N}\| \right)$$

where ||•|| is a chosen vector norm, usually the l2 norm.

The optimization problem has a very straightforward graph interpretation. A weighted complete undirected graph G with n+1 vertices is created, where each perturbation pattern $\delta x_i$ is a vertex, and 0 is also one vertex (corresponding to the base light). The weight of an edge between two vertices is just the norm of the difference between the two corresponding perturbation patterns. Finding the solution is equivalent to finding the shortest Hamiltonian cycle of G, or the famous Travelling Salesman Problem (TSP) that has been intensely studied.

The Travelling Salesman Problem is well-known to be NP-hard, and there is no efficient exact algorithm. However, many heuristic algorithms can be used to find sub-optimal but very good solutions. Any algorithm such as a genetic algorithm may be used to solve it.

Analysis of the Light Transport Matrix

Interpretation and use of the light transport model or matrix to estimate occupancy may be implemented in any manner. Three different approaches (Classification, 3D Scene Estimation and Light Reflection) are described herein, although others could likewise be utilized.

1. Classification

The light transport matrix A is dependent only on the room occupancy, and independent of the input to the LED light fixtures or the ambient light. Thus, once the matrix A is recovered, one can infer high level information about the room occupancy from this matrix. The simplest method is to directly use the numeric entries of matrix A (or matrix $E=A_0-A$) as features of the occupancy scenario, and use supervised learning to discriminate among various occupancy scenarios in the smart room.

For this classification task, color sensors may be installed on the walls of the smart room. Note however that the sensors can be installed either on the wall or on the ceiling for the classification task, as long as they are spread all over the room to capture the entire space. For the classification task, the spatial coordinates of the fixtures or the sensors are not required. All that is needed are the values of the matrix A.

Classification Problem Examples

Two classification examples are considered, but others could be similarly implemented. The first one is a four-category classification problem, where the goal is to determine whether the room is: (1) empty, (2) occupied by a small group (one to three) of people, (3) occupied by a large group (four to seven) of people gathering in the room, or (4) occupied by a large group of people scattered in the room.

The second approach, which is much more difficult, is a fifteen-category classification problem, where the goal is to discriminate between single individuals and small groups (two to three) of people, and also locate which part of the room they occupy. In this case, the room is divided into six regions and the fifteen categories are: (1) empty, (2)-(7) one of the six regions containing one individual, (8)-(13) one of the six regions containing a small group, (14) a large group gathered, and (15) a large group scattered. As noted, other classification approaches could be employed.

The classification approach may be implemented using supervised learning that includes testing and training data. For example, data for a room may be collected under various room occupancy scenarios in which the LED light fixtures are randomly perturbed and the sensor outputs are measured. During each event, human subjects enter the room and the number and location of the subjects is recorded.

The entries of the matrix E may be used as the features such that the feature dimension is m1m2=1728. These features are then normalized—each entry is subtracted by its mean and divided by its standard deviation over the training set. For each of the classification problems that were set up, a radial basis function (RBF) kernel support vector machine (SVM) may be used as the classifier, and the mean average precision (mAP) may be used as a goodness measurement. Because different categories have different sizes, other performance measures such as accuracy can be highly biased, especially when some easiest classes are significantly larger than others. For each category, a one-versus-all SVM is trained, and the decision scores are used to compute the average precision (AP). Then the mAP is simply the mean value of the average precisions for all categories.

In the Four-Category Classification situation using rank minimization to recover light transport changes, experimental results achieved a mAP of 88.62%, compared with the mAP of random guess being 25.54%. Using l1 minimization, a mAP of 81.92% was achieved. Using l0 minimization, the mAP was 71.19%.

For the fifteen-category classification problem, using rank minimization to recover light transport changes, a mAP of 78.69% was achieved, compared with the mAP of random guess being 7.95%. Using l1 minimization the mAP was 68.37%, while using l0 minimization the mAP was 50.76%. For large spaces where the number of classes becomes prohibitive to use classification directly, the space can be subdivided and handled as a set of smaller subspaces and the results combined.

2. 3D Scene Estimation with Light Blockage Model

The classification approach above directly uses the numeric entries of matrix A or E to learn the occupancy patterns from training data. No geometric or spatial information of the room, the fixtures, or the sensors are integrated into the classification method, which results in some limitations. In this approach, a 3D scene estimation method is utilized, which exploits the spatial information of the indoor space, especially the blockage of light paths by occupants.

Recall that the light transport matrix of an empty room is denoted as $A_0$. At run time, the light transport matrix is A, and $E=A_0-A$ is the difference matrix. Matrix E is also m2×m1, and each entry of E corresponds to one fixture channel and one sensor channel (light flow from one fixture to one sensor at a given wavelength, or color). If one entry of matrix E has a large positive value, it means that many of the light paths from the corresponding fixture to the corresponding sensor are very likely blocked. From any given fixture to any given sensor, there are numerous diffuse reflection paths and one direct path, which is the line segment 60 connecting the light and the sensor shown in FIG. 4. Obviously, the direct path is the dominating path, if one exists. Thus a large entry of E will most likely imply the corresponding direct path has been blocked by the change of occupancy. This model is referred to as the light blockage model (LBM).

Though each entry of E corresponds to one direct path, the opposite is not true, since each LED fixture or sensor has multiple channels. Assume the number of LED fixtures is NL, and the number of sensors is NS. The m1×m2 matrix E can be aggregated to an NS×NL matrix $\hat{E}$, such that the mapping from the entries of $\hat{E}$ to all direct paths is a bijection. In the examples provided herein, m1=3NL=36 and m2=4NS=48. The aggregation is performed on each fixture-sensor pair as a summation over three color channels: red, green, and blue, as shown in FIG. 5, or simply:

$\hat{E}_{i,j}=E_{4i-3,3j-2}+E_{4i-2,3j-1}+E_{4i-1,3j}.$

Figure 5:
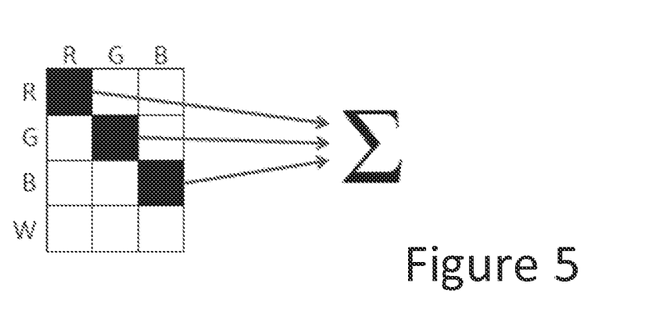
FIG. 5 depicts an aggregation of a 4×3 submatrix according to embodiments.

FIG. 5 shows the aggregation on a 4×3 submatrix of E.

Volume Rendering

After aggregation, if $\hat{E}$ has a large entry at (i, j), then the direct path from fixture j to sensor i is very likely blocked, though it is not known why or specifically where the blockage happens along this path. By assuming the room occupants have large cross sections compared to the thickness of a light path, any position that is close to this direct path is also likely being occupied. If two or more such direct paths intersect or approximately intersect in the 3D space, then it is most likely that the blockage happens at their intersection 62, as shown in FIG. 4. Based on this assumption, the following reconstruction algorithm is described. Let P be an arbitrary point in the 3D space, and $d_{i,j}(P)$ be the point-to-line distance from point P to the direct path from fixture j to sensor i. The confidence of point P being occupied is C(P), which is computed by:

$$C(P) = \frac{\sum_{i=1}^{N_S}\sum_{j=1}^{N_L} \hat{E}_{i,j} G(d_{i,j}(P), \sigma)}{\sum_{i=1}^{N_S}\sum_{j=1}^{N_L} G(d_{i,j}(P), \sigma)},$$

where $G(\bullet, \bullet)$ is the Gaussian kernel:

$$G(a, \sigma) = \exp\left(-\frac{a^2}{2\sigma^2}\right).$$

The denominator of C(P) is a normalization term for the non-uniform spatial distribution of the LED fixtures and the sensors. The $\sigma$ is a measure of the continuity and smoothness of the occupancy, and should be related to the physical size of the occupants one would expect. For simplicity, $\sigma$ is assumed isotropic. If the 3D space is discretized and evaluated at every position P(x, y, z), a 3D volume V(x, y, z)=C(P(x, y, z)) of the scene can be rendered. This 3D volume is also called the 3D confidence map.

3. Occupancy Map Estimation with Light Reflection Model

The 3D scene estimation approach may require sensors being installed on the walls and may have room size limitations. To estimate the occupancy with sensors installed on the ceiling, the occupancy estimation method based on light reflection model can be utilized.

When all color sensors are installed on the ceiling, there no longer is any information about the z-axis (vertical) direction. The light blockage model is no longer valid since there are no direct light paths from fixtures to sensors. All light paths are diffuse reflection paths. Thus a light reflection model based on geometrical optics and photometry is proposed.

Figure 6:
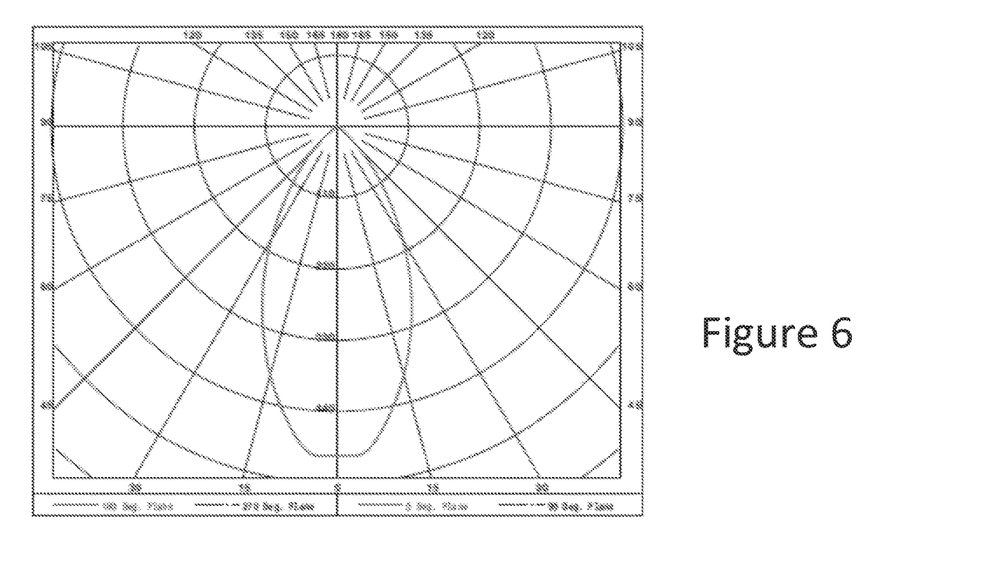
FIG. 6 depicts a luminosity plot of an LED fixture according to embodiments.
Figure 7:
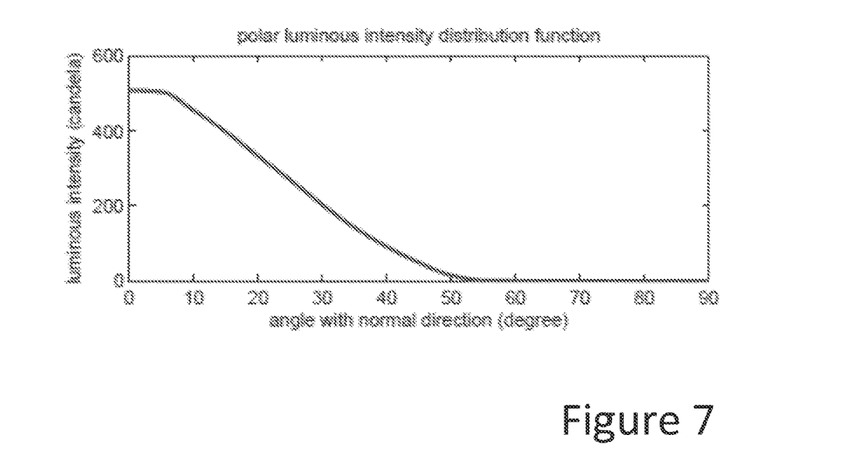
FIG. 7 depicts a luminosity plot of an LED fixture according to embodiments.

Before describing the light reflection model, the physical quantities of the fixtures and sensors need to be described. In photometry, luminous intensity measures the power emitted by a light source in a particular direction per unit solid angle. The numeric values read from the sensors are the luminous flux, which measures the perceived power of light. For a light source, the luminous intensity is usually non-isotropic. For example, the polar luminous intensity distribution graph of a Vivia 7DR3-RGB fixture is provided in FIG. 6. If the luminous intensity in the normal direction is $I_{max}$, then in the direction with angle $\theta$ to the normal direction, the luminous intensity is $I_{max} \cdot q(\theta)$, where $q(\theta)$ is called the polar luminous intensity distribution function. FIG. 7 depicts a plot of $I_{max} \cdot q(\theta)$ as a function of $\theta$.

Figure 8:
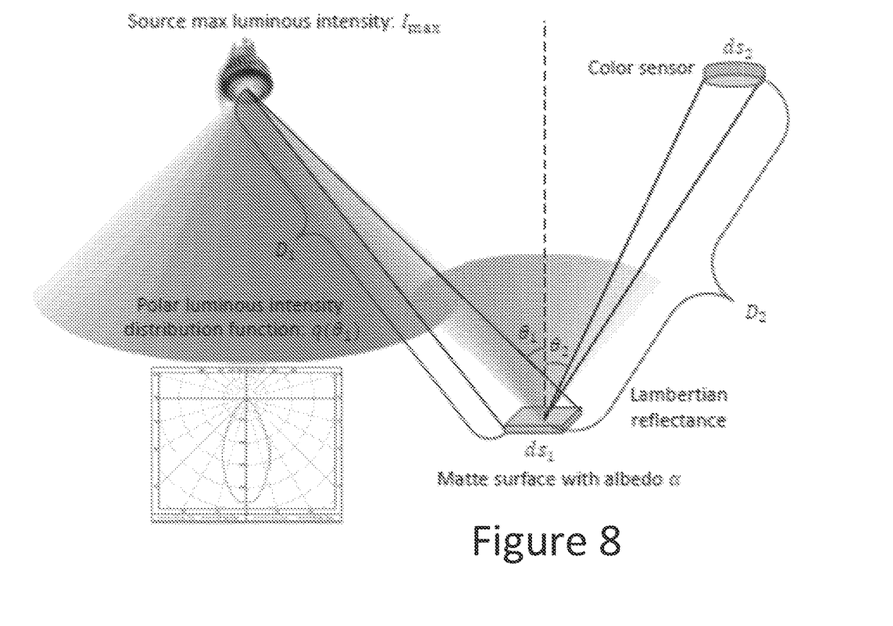
FIG. 8 depicts a light reflection model according to embodiments.

With the color sensors installed on the ceiling, a large value in the aggregated difference matrix $\hat{E}$ means that the light paths from the corresponding fixture to the corresponding sensor are affected. Though these light paths are all diffuse reflection paths, they provide a rough estimation about which regions in the room are more likely to be occupied than others. For this purpose, a very small area $ds_1$ on the floor and one fixture-sensor pair is considered. As shown in FIG. 8, the fixtures are illuminating the room downward, and the color sensors are "looking" downward. Assume the sensing area of the color sensor is $ds_2$, the angle of the light path from the fixture to $ds_1$ is $\theta_1$, the light path from $ds_1$ to $ds_2$ is $\theta_2$, the distance from the fixture to $ds_1$ is $D_1$, and the distance from $ds_1$ to $ds_2$ is $D_2$. Also assume that $ds_1$ is a Lambertian surface that is ideal matte with albedo $\alpha$. First, the luminous flux arriving at $ds_1$ from the fixture is considered. The luminous intensity along the light path from the fixture to $ds_1$ is $I_{max} \cdot q(\theta_1)$, and the solid angle is: $ds_1 \cos\theta_1/4\pi D_1^2$. Thus the luminous flux arriving at $ds_1$ is the product of the luminous intensity and the solid angle:

$$\Phi_1 = I_{max} \cdot q(\theta_1) \cdot \frac{ds_1 \cos\theta_1}{4\pi D_1^2}.$$

Since the albedo of $ds_1$ is $\alpha$, the luminous intensity of the reflected light from $ds_1$ in the normal direction is proportional to $\alpha\Phi$. For simplicity, $\alpha\Phi$ is used to denote the luminous intensity in the normal direction. Since ds1 is a Lambertian surface, the surface's luminance is isotropic, and the luminous intensity obeys Lambert's cosine law. Thus the luminous intensity of the reflected light along the light path from $ds_1$ to $ds_2$ is $\alpha\Phi_1 \cos\theta_2$. The solid angle from $ds_1$ to $ds_2$ is: $ds_2 \cos\theta_2/4\pi D_2^2$. Thus finally, the luminous flux arriving at $ds_2$ from the fixture and reflected by $ds_1$ is:

$$\Phi_2 = \alpha\Phi_1 \cos\theta_2 \cdot \frac{ds_2 \cos\theta_2}{4\pi D_2^2}$$

$$= \alpha I_{max} \cdot q(\theta_1) \cdot \frac{ds_1 \cos\theta_1}{4\pi D_1^2} \cdot \cos\theta_2 \cdot \frac{ds_2 \cos\theta_2}{4\pi D_2^2}.$$

For all fixtures, $I_{max}$ and the function $q(\bullet)$ are the same. For all sensors, $ds_2$ is the same. For different positions on the floor, we assume the albedo $\alpha$ is constant, and use a $ds_1$ of the same area. Then $\Phi_2$ is a function of the position on the floor:

$$\Phi_2 = K \cdot q(\theta_1) \cdot \frac{\cos\theta_1 \cos^2\theta_2}{D_1^2 D_2^2},$$

where K is a constant irrelevant with the position. $\theta_1$, $\theta_2$, and $D_1$ and $D_2$ are all dependent on the position. The sensor response given here is just an example. The physical construction of the sensor including lenses and housings will alter its response as a function of angle relative to boresight. This response is easily measured (or specified) and incorporated into the model as part of the system design.

A confidence map for this approach may be implemented as follows. Intuitively, if there is a large value in matrix $\hat{E}$, then the corresponding fixture-sensor pair can be found, and $\Phi_2$ can be computed at all positions on the floor. At positions where $\Phi_2$ has larger values, it is more likely that the occupant is there.

Based on this intuition, $\Phi_2$ can be precomputed at all positions for all fixture-sensor pairs offline. The precomputed $\Phi_2$ at all positions is referred to as the reflection kernel of the corresponding fixture-sensor pair. Let the reflection kernel for fixture j and sensor i be $R_{i,j}$. Then the confidence map can be simply computed as a weighted sum of all these reflection kernels:

$$C = \sum_{i=1}^{N_S} \sum_{j=1}^{N_L} \hat{E}_{i,j} R_{i,j}.$$

It is understood that while the particular model described with reference to FIG. 8 assumes that the sensor response as a function of the angle is limited to cosine foreshortening, actual sensor responses will typically be more robust, and such responses may be readily modeled into the reflection kernel.

Figure 10:
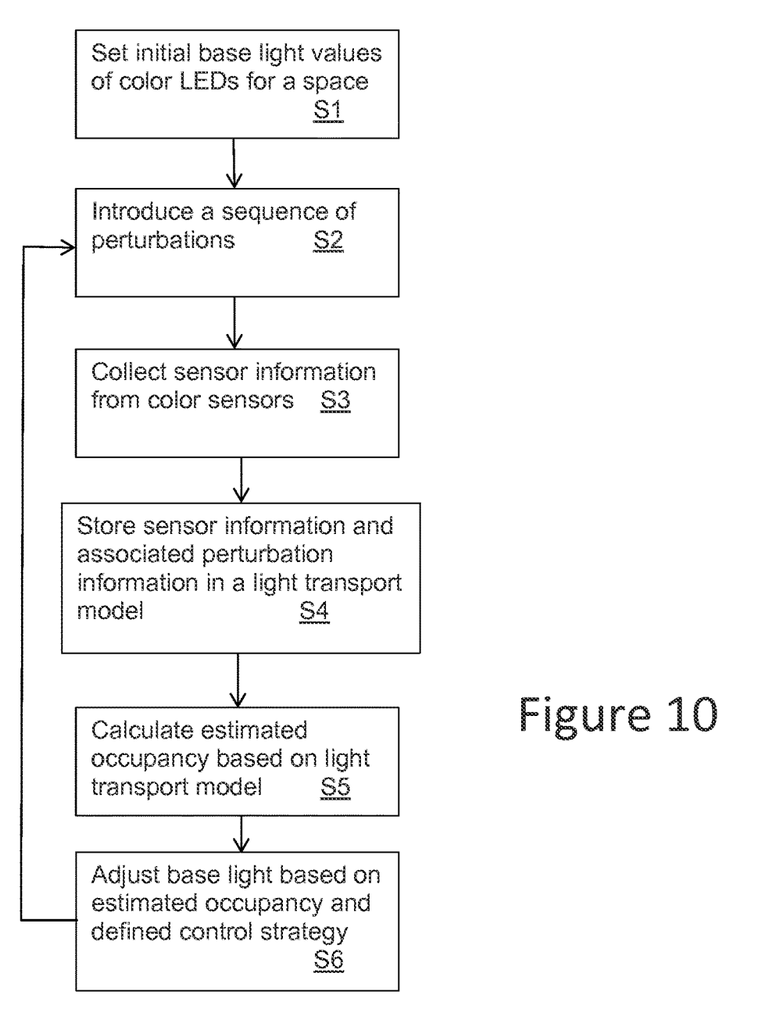
FIG. 10 depicts a flow diagram of a method for implementing smart lighting according to embodiments.

Referring to FIG. 10, a flow diagram of an illustrative method for implementing smart lighting in a space is provided. At S1, initial base light control values of color LEDs for a space are set. At S2, a sequence of perturbations are introduced into the lighting and at S3, sensor information from a set of color sensors is collected. At S4, the sensor information and associated perturbation data are stored in a light transport model. Next, an estimated occupancy is calculated based on the light transport model at S5 (either directly or based on changes to the light transport model). At S6, the base light is adjusted based on the estimated occupancy and defined control strategy. The process then loops back to S2, where S2-S6 are periodically repeated (at regular or irregular intervals).

The described approach to occupancy sensing allows a smart lighting system to infer not only the presence of people in a space, but also to determine their spatial distribution in that space. The system requires no cameras, thus avoiding privacy and/or security concerns. Instead, simple color sensors are used in conjunction with, e.g., color controllable solid-state light fixtures via a combination of inverse transform, reflectance, and machine learning models to determine where the people are in the room, in real time, and in a completely confidential way. The color sensors are very inexpensive and the existing solid-state lighting fixtures are modulated in a manner invisible to the room's occupants, to interrogate the space. The spatial distribution of the room's occupants can be used to classify the activities ongoing in the space and, from there, drive an appropriate control strategy to optimize the brightness, spatial distribution, and spectral characteristics of the synthetic light to reduce energy consumption while improving human comfort, well-being, and productivity.

Referring again to FIG. 3, it is understood that computing system 30 may comprise any type of computing device and, and for example includes at least one processor 32, memory 36, an input/output (I/O) 34 (e.g., one or more I/O interfaces and/or devices), and a communications pathway 17. In general, processor(s) 32 execute program code for implementing a lighting control system 38 of the present invention, which is at least partially fixed in memory. While executing program code, processor(s) 32 can process data, which can result in reading and/or writing transformed data from/to memory 36 and/or I/O 34 for further processing. The pathway 17 provides a communications link between each of the components in computing system 30. I/O 34 may comprise one or more human I/O devices, which enable a user to interact with computing system 30.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

The invention claimed is:

1. A smart lighting system comprising:
a plurality of non-imaging color sensors;
a plurality of color controllable lights;
a system that perturbs the color controllable lights within a space;
a system that collects resulting color information from the non-imaging color sensors, and builds a light transport model based on collected color information;
a system that estimates an occupancy within a space calculated from the light transport model; and
an adjustment module that adjusts the color controllable lights based on the light transport model and a predefined control strategy.

2. The system of claim 1, wherein the color controllable lights comprise light emitting diodes (LEDs).

3. The system of claim 2, wherein the LEDs include a plurality of color channels.

4. The system of claim 1, wherein the light transport model comprises a light transport matrix.

5. The system of claim 4, wherein the occupancy is estimated based on a classification methodology that utilizes supervised learning to evaluate data in the light transport matrix.

6. The system of claim 4, wherein the occupancy is estimated based on a three dimensional (3D) scene estimation method that identifies blocked light paths within the space.

7. The system of claim 4, wherein the occupancy is estimated based on an occupancy map estimation method that evaluates reflected light.

8. A method for controlling lighting in a space having a plurality of color sensors and a plurality of color controllable lights, the method comprising:
outputting control values to the color controllable lights to cause a base light to be generated within a space;
periodically outputting further control values to perturb the color controllable lights within the space;
collecting resulting color information from the color sensors;
building a light transport model based on the color information;
utilizing the light transport model to calculate an estimated occupancy of the space; and
adjusting the base light in response to the estimated occupancy and a predefined control strategy.

9. The method of claim 8, wherein the color controllable lights comprise light emitting diodes (LEDs).

10. The method of claim 9, wherein the LEDs include a plurality of color channels.

11. The method of claim 8, wherein the light transport model comprises a light transport matrix.

12. The method of claim 11, wherein the occupancy is estimated based on a classification methodology that utilizes supervised learning to evaluate data in the light transport matrix.

13. The method of claim 11, wherein the occupancy is estimated based on a three dimensional (3D) scene estimation method that identifies blocked light paths within the space.

14. The method of claim 11, wherein the occupancy is estimated based on an occupancy map estimation method that evaluates reflected light.

15. A lighting control system that adjusts a set of color controllable LED lights based on an estimated occupancy, the system comprising:
a lighting controller that outputs control values to the set of color controllable LED lights to generate a base light within the space and to cause perturbations to the base light;
a sensor data manager that receives sensed color information from a plurality of non-imaging color sensors located within the space;
a light transport modeler that stores the sensed color information and associated perturbation information in a light transport model; and an occupancy estimation system that calculates an estimated occupancy of the space based on the light transport model, wherein the estimated occupancy is provided to the lighting controller to adjust the base light.

16. The lighting control system of claim 15, further comprising a strategy manager that includes a control strategy to further adjust the base light.

17. The lighting control system of claim 15, wherein the light transport model comprises a light transport matrix.

18. The lighting control system of claim 17, wherein the estimated occupancy is calculated based on supervised learning to evaluate data in the light transport matrix.

19. The lighting control system of claim 17, wherein the estimated occupancy is calculated based on an identification of blocked light paths within the space.

20. The lighting control system of claim 17, wherein the estimated occupancy is calculated based on reflected light within the space.

\* \* \* \* \*